United States Patent

Martz

[11] Patent Number: 5,501,068
[45] Date of Patent: Mar. 26, 1996

[54] MULCHING ROTARY LAWN MOWER BLADE

[75] Inventor: William Martz, Holcomb, N.Y.

[73] Assignee: Foley/PLP Co., Rochester, N.Y.

[21] Appl. No.: 308,785

[22] Filed: Sep. 19, 1994

[51] Int. Cl.⁶ .................................................. A01D 34/73
[52] U.S. Cl. ........................... 56/255; 56/295; 56/DIG. 17
[58] Field of Search ........................... 56/17.5, 255, 295, 56/DIG. 17, DIG. 20

[56] References Cited

U.S. PATENT DOCUMENTS

| | | | |
|---|---|---|---|
| 3,665,692 | 5/1972 | Hughes | 56/295 |
| 4,189,903 | 2/1980 | Jackson et al. | 56/255 |
| 4,205,512 | 6/1980 | Thorud | 56/13.4 |
| 4,944,142 | 7/1990 | Sueshige et al. | 56/320.1 |
| 5,035,108 | 7/1991 | Meyer et al. | 56/13.4 |
| 5,090,183 | 2/1992 | Thorud et al. | 56/2 |
| 5,094,065 | 3/1992 | Azbell | 56/255 |
| 5,191,756 | 3/1993 | Kuhn | 56/17.5 |
| 5,209,052 | 5/1993 | Carroll | 56/255 |
| 5,210,998 | 5/1993 | Hojo et al. | 56/255 |
| 5,259,176 | 11/1993 | Kahamura et al. | 56/255 |
| 5,274,987 | 1/1994 | Wiener | 56/14.8 |
| 5,284,006 | 2/1994 | Sheldon | 56/255 |
| 5,299,414 | 4/1994 | Long | 56/17.4 |
| 5,327,710 | 7/1994 | Phamper et al. | 56/DIG. 17 X |

Primary Examiner—Terry Lee Melius
Attorney, Agent, or Firm—M. LuKacher

[57] ABSTRACT

A mulching blade for a gasoline- or electrically-powered rotary lawn mower having a housing, which blade is mounted on the shaft of the lawn mower motor below the deck of the housing. The blade has a central mounting area and inner and outer sections sharpened on their leading edges which extend radially from the mounting area. The outer section cuts the unmowed grass. All sections are pitched upwardly away from the direction of rotation of the blade to lift the clippings as they are cut by the outer section and to turbulently suspend the clippings within the housing while the inner sections re-cut them repeatedly, comminuting the clippings into a fine mulch which falls by gravity to the soil level under the grass. Preferably there are three inner sections which jointly form an arch between the mounting area and the outer section and act as a comminuting tubulator. The comminuting and cutting sections are twisted progressively from the mounting area to the outer tip of the blade so that the blade acts as a propeller. Aerodynamic drag is sufficiently reduced such that a mowing time of more than 90 minutes per charge is provided to a battery-powered electric mower equipped with the subject mulching blade.

14 Claims, 3 Drawing Sheets

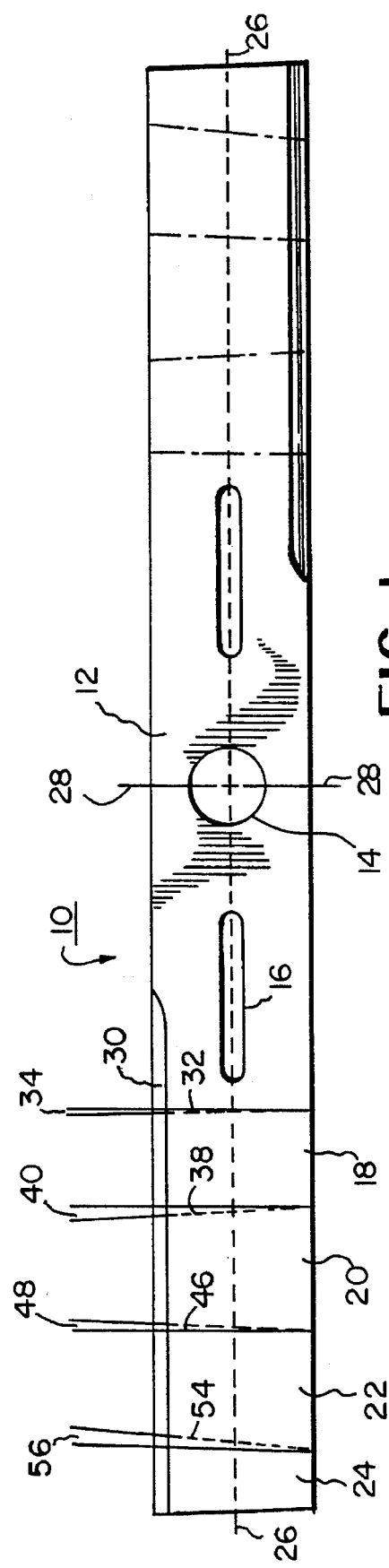
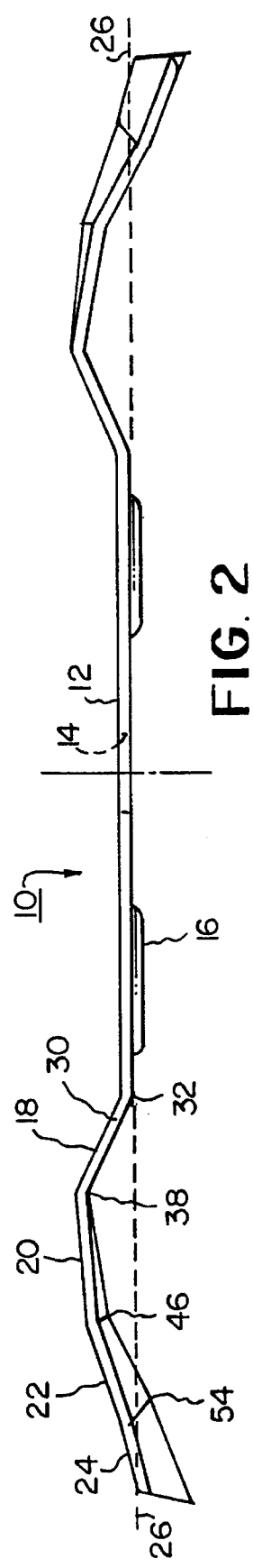

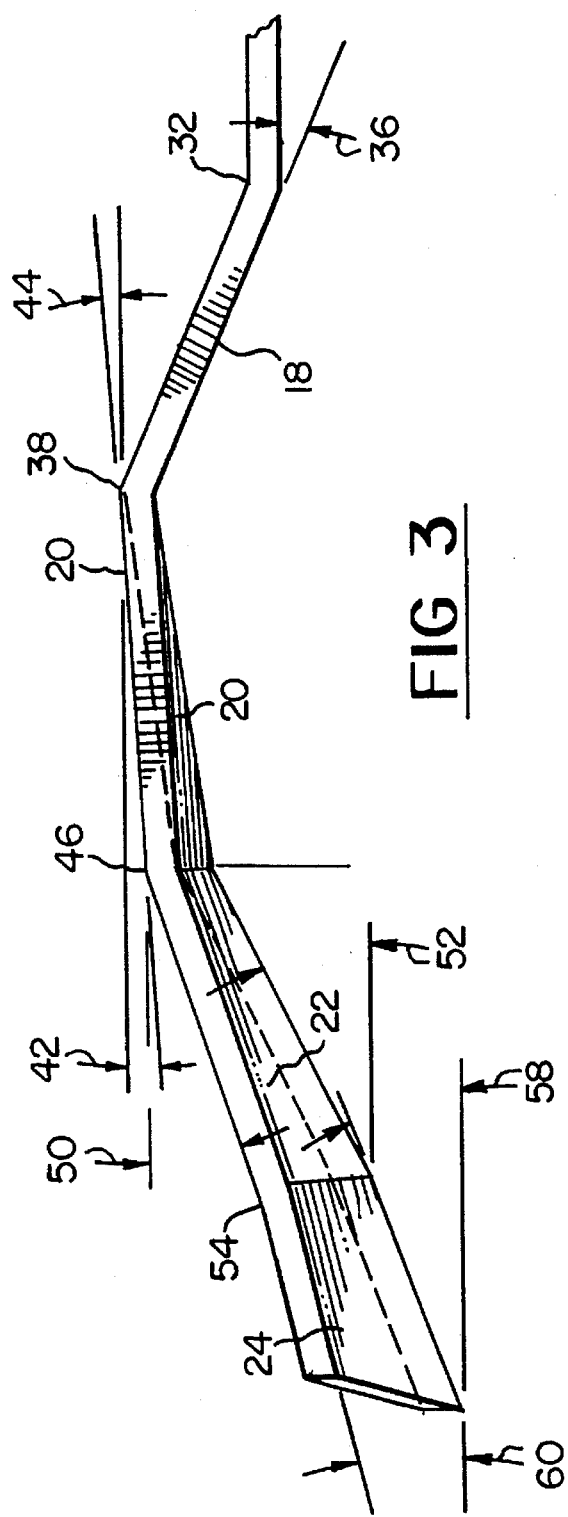
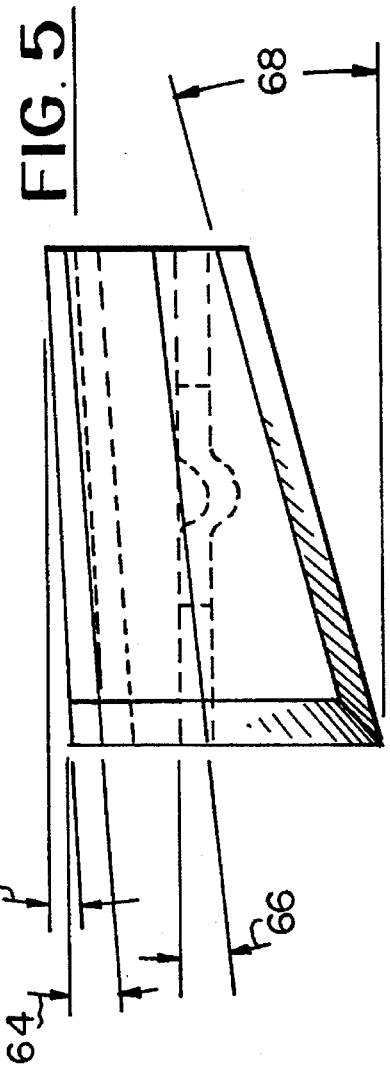

MULCHING ROTARY LAWN MOWER BLADE

DESCRIPTION

The present invention relates to lawn mower blades and particularly to mulching blades for rotary lawn mowers with closed deck.

The invention is suitable for use in a rotary mulching mower with a closed deck which repeatedly cuts and comminutes grass clippings and distributes them back into the lawn at soil level for forming a mulch.

The invention is especially suitable for use with battery-powered rotary lawn mowers designed for mulching, such as for example the mowing apparatus disclosed in U.S. Pat. No. 5,299,414 issued to Long on Apr. 5, 1994 and assigned to Ryobi America Corp., Anderson, S.C.

Environmental concerns, particularly the lack of landfill capacity, have resulted in legislation in some communities precluding the disposal of lawn grass clippings in landfills. Mulching mowers have heretofore been proposed. However, they have been expensive, requiring specially designed lawn mower housings with baffles to avoid generation of clumps which tend to smother the remaining grass instead of a fine discharge of comminuted clippings suitable for mulching beneath the surface of the lawn. See U.S. Pat. Nos. 4,189,903 issued Feb. 26, 1980 to Jackson et al. and 4,205,512 issued Jun. 3, 1980 to Thorud. It is desirable that the finely distributed clippings be provided by the operation of the lawn mower blade alone without special baffles or vanes in the lawn mower housing. It has been proposed to provide special mulching blades with up-pumping sections which lift and cut grass at the outsides thereof and down-pumping sections which push recur grass downwardly towards the ground. See, for example, the blade disclosed by Long cited hereinabove, and also the blade disclosed in U.S. Pat. No. 5,094,065 issued Mar. 10, 1992 to Azbell. Such blades, however, are subject to clogging and can produce undesired clumps. Because of their downward-pumping design, these blades tend to discharge re-cut grass before it has been adequately comminuted, especially when the grass being cut is high or wet.

Battery-powered electric mowers are becoming popular. However, a key performance issue is the mowing time sustainable on a single charge of the battery. Mowing time is strongly influenced by the aerodynamic drag of the mower blade within the mower housing. Previous mulching blades have permitted only relatively short mowing times because of non-optimized aerodynamic designs used to achieve an acceptable degree of comminution of grass clippings.

It is a principal object of the present invention to provide an improved mulching rotary lawn mower blade which produces a fine mulch of grass clippings and distributes them evenly into the uncut grass at soil level without clogging in the lawn mower housing and without producing clumps of clippings.

It is a further object of the present invention to provide an improved mulching rotary lawn mower blade which is more effective in mulching clippings and distributing them back into the grass at soil level than are mulching blades which have heretofore been proposed.

It is a still further object of the present invention to provide an improved mulching rotary lawn mower blade by which a fine mulch of clippings and a wide distribution of mulch is obtained by virtue of the operation of the blade itself.

It is a still further object of the invention to provide an improved mulching rotary lawn mower blade which can be produced with equipment which is used for producing conventional lawn mower blades by pressing the blades from strips of sheet steel stock.

It is a still further object of the invention to provide an improved mulching rotary lawn mower blade which, when installed in a battery-powered electric rotary lawn mower, will allow for a longer time of mowing on a single battery charge than will previous mulching blades.

It is a still further object of the invention to provide an improved mulching rotary lawn mower blade which will allow 90 minutes of mowing time when installed in a battery powered lawn mower such as a Ryobi Mulchinator battery-powered rotary lawn mower, sold by Ryobi America Corp., Anderson, S.C.

Briefly described, a mulching lawn mower blade embodying the invention is formed from, for example, strap steel stock sharpened along one edge, by bending the stock at chosen angles to provide a plurality of sections. The blade has a central mounting area, attachable to a lawn mower motor drive shaft, and a plurality of functional sections, preferably four, outward from the mounting area in at least one direction and preferably symmetrically in opposite directions. Each section has a continuous cutting edge on its rotationally forward side which encounters the grass as the blade is rotated. The first three sections comprise a re-cutting region of the blade, and the fourth section comprises a primary cutting region.

In all four sections, the trailing edge of the blade is higher than the leading or cutting edge, making the functional area a propeller forcing air upward over its entire length. The clippings within the mower housing are therefore repeatedly lofted as the blade rotates and chops the clippings into a fine mulch. Fine clippings eventually fall through the spinning blade which disperses them evenly over a wide area of lawn beneath the mower. It is an important feature of the invention that the blade has no areas in which the trailing edge is lower than the leading edge and therefore provides no downward thrust to drive the just-cut clippings immediately into the lawn but rather keeps them suspended within the housing long enough for the blade to re-cut them many times.

In profile, the blade has a first section inclined upwardly and outwardly from the mounting area. The second section is above and inclines outwardly toward the plane of the mounting area. The third section inclines downwardly and outwardly toward and through the plane of the mounting area. The fourth section also inclines downwardly and outwardly but at a lesser angle than does the third section. The bend angles of the sections are not perpendicular to the longitudinal axis of the blade but rather are chosen such that the first three cutting sections, referred to as the inner sections, constitute an arch-shaped comminuting turbulator which violently agitates the clippings within the housing by creating an updraft above all three sections while recutting the clippings. The fourth, and outer, section is the primary grass cutter.

In all cases, upward and downward are taken to mean as relative to the plane of the mounting area of the blade and to the ground upon which the mower operates, and inner and outer are taken to mean in the direction of the longitudinal axis of the blade from the axis of rotation.

The chosen bend angles provide a blade which can produce a fine, highly-comminuted mulch while also having sufficiently low aerodynamic drag to provide a continuous mowing time of at least 90 minutes for a battery-powered electric mulching law mower.

The foregoing and other objects, features, and advantages of the invention, as well as a presently preferred embodiment thereof, will become more apparent from a reading of the following description wherein:

FIG. 1 is a plan view of a blade in accordance with the invention;

FIG. 2 is a front elevational view of the blade shown in FIG. 1;

FIG. 3 is an enlarged view of one end of the blade shown in FIG. 2;

FIG. 5 is a partial and elevational view of the blade shown in FIG. 1 as seen from an end of the blade.

Figure 4:
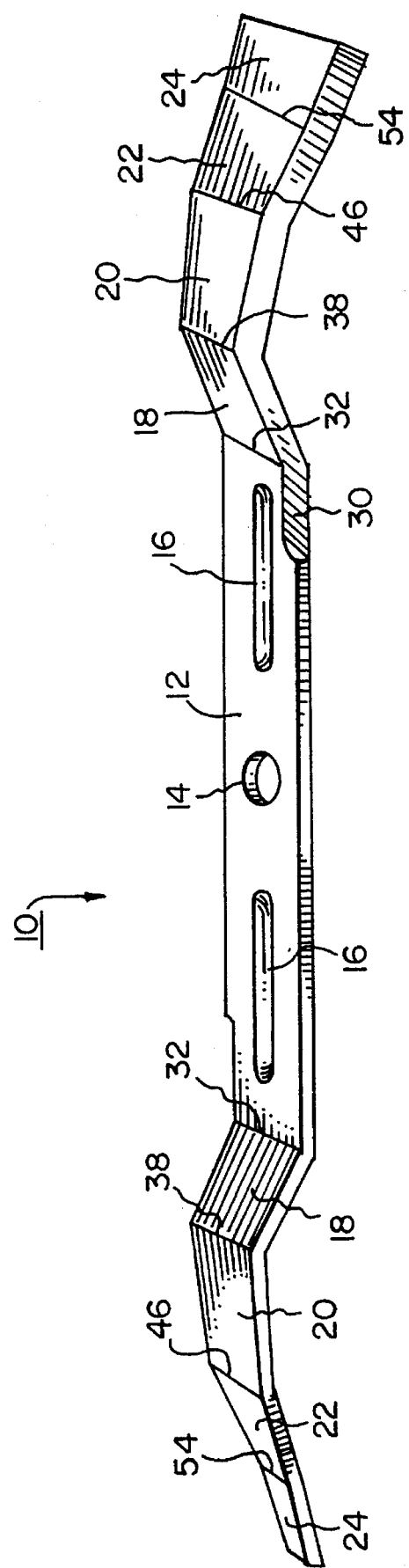
FIG. 4 is a perspective view of the blade shown in FIGS. 1 and 2.

Referring more particularly to the drawings, there is shown a mulching lawn mower blade 10 having a mounting area 12 with a center hole 14 of universal design which is adapted to be received in most lawn mowers for mounting the blade on the motor drive shaft within the housing of the lawn mower. The mower housing has a skirt along its sides (see, e.g. Long U.S. Pat. No. 5,299,414 cited above). Mounting area 12 may have gussets 16 for strengthening and stiffening purposes.

Extending sequentially from mounting area 12 and bent at chosen horizontal and vertical angles from the plane of the mounting area are first, second, and third inner sections, 18, 20, and 22, respectively. Collectively, the three inner sections form an aerodynamically efficient re-cutting turbulator which comminutes and distributes grass clippings as the blade rotates. Fourth, or outer, section 24 is the primary grass cutter and extends to the end of the blade. Each of the four sections may be up to several inches long. It is preferable that the blade be formed symmetrically about its axis of rotation, having cutting and re-cutting capability on both halves, although in principle only the part of the blade on one side of the axis of rotation need be designed for cutting purposes.

The blade is formed by pressing from a strip of steel (e.g., cold rolled steel); e.g., Type 10B38 steel, hardness Rockwell-C 35–40 which is 0.135 inches thick by 2 inches wide. The longitudinal center line 26 extends along the middle of the width of the blade and is perpendicular to the lateral center line 28 which extends between the opposite edges of the blade. The axis of rotation is at the intersection of the center lines 26 and 28.

Each of the four sections is provided with a continuous sharpened leading edge 30 made by milling a 35° bevel along the upper side of the leading edge of the blade preferably before bending the blade to form the blade sections.

The comminuting turbulator is formed by bending the strap stock at specific horizontal and vertical angles, as shown in FIGS. 1, 3, and 5. All horizontal angles are expressed from the trailing edge of the blade in the direction of rotation. All vertical angles are expressed from the plane which includes longitudinal center line 26 and is perpendicular to the axis of rotation. First bend 32 is at a first horizontal angle 34 away from lateral center line 28, preferably about 1°, and at a first upward vertical angle 36 of preferably about 26°. Second bend 38 is at a second horizontal angle 40 away from lateral center line 28, preferably about 4°, and a slight propeller twist is produced in second inner section 20 by differing the vertical downward angles 42 and 44 preferably about 3° at the trailing edge and 4° at the leading edge, respectively. Third bend 46 is at a third horizontal angle 48 preferably equal and opposite to first horizontal angle 34, and further propeller twist is produced in third inner section 22 by differing the vertical downward angles 50 and 52 preferably about 18° at the trailing edge and 26° at the leading edge, respectively. This combination of horizontal and vertical bend angles provides a three-section arch-shaped turbulator in which the trailing edge of each section is farther from the ground than is the leading or cutting edge. Second bend 38 tilts upward away from the direction of rotation by angle 62, preferably about 3°; third bend 46 tilts upward by angle 64, preferably about 4°; and fourth bend 54 tilts upward by angle 66, preferably about 4°.

The fourth bend 54 is at a fourth horizontal angle 56 preferably equal and opposite to second horizontal angle 40, and further propeller twist is produced in outer section 24 by differing the leading and trailing edge bend angles 58 and 60, respectively, such that the leading edge is bent at preferably about 20° from the horizontal and the trailing edge at preferably about 9° from the horizontal. Thus the trailing edge of the outer, or cutting, section is farther from the ground at all points than is the leading or cutting edge. The trailing corner of the blade is preferably about 10° higher than the leading corner (vertical angle 68). This combination of horizontal and vertical bend angles provides a cutting section which cuts grass cleanly and creates an air flow which deflects the clippings upward against the mower housing and thence into the region of the comminuting turbulator. Because the propeller twist in the blade is progressive through the inner and outer sections, and because the outer section rotates at the highest linear velocity, the outer section has the greatest propeller thrust and therefore clippings will flow toward the turbulator to be comminuted and dispersed. While the foregoing theory of operation of the blade in cutting grass to mulch is believed accurate, it is only a theory and the invention is not limited thereto.

An 18-inch mulching blade in accordance with the invention was installed in a fully-charged battery-powered Ryobi Mulchinator lawn mower, and satisfactory lawn mowing and clipping mulching was obtained for a period of time greater than 90 minutes.

Variations and modifications in the herein described blade, within the scope of the invention, will undoubtedly suggest themselves to those skilled in the art. Accordingly, the foregoing description should be taken as illustrative and not in a limiting sense.

What is claimed is:

1. A lawn mower blade adapted to be used in a rotary lawn mower, said blade having a longitudinal axis and leading and trailing edges wherein said leading edge is sharpened for cutting grass, comprising:

a) a mounting area which includes said longitudinal axis for mounting said blade on said rotary lawn mower; and b) a plurality of cutting sections disposed along the length of said blade outward from said mounting area, wherein the leading edge of said each of said cutting sections is nearer to the ground than is the trailing edge of said each of said cutting sections.

2. The blade according to claim 1 wherein said plurality of cutting sections are in angled relationships to each other.

3. The blade according to claim 2 wherein said plurality of cutting sections comprise at least one outer section for cutting uncut grass and at least one inner section comprising a comminuting turbulator for comminuting and mulching grass clippings cut by said outer section.

4. The blade according to claim 3 wherein said comminuting turbulator comprises a plurality of sections.

5. The blade according to claim 4 wherein said comminuting turbulator comprises three sections.

6. The blade according to claim 5 wherein:

a) said first section is inclined upward and outward from said mounting area in the direction of said longitudinal axis;

b) said second section is adjacent to said first section and is inclined downward from the horizontal and outward in the direction of said longitudinal axis; and c) said third section is adjacent to said second section and is inclined further downward from the horizontal and outward in the direction of said longitudinal axis.

7. The blade according to claim 6 wherein said outer section is adjacent to said third section and is inclined downward from the horizontal and outward in the direction of said longitudinal axis.

8. The blade according to claim 7 wherein all adjacent sections meet at lines which are not perpendicular to the direction of said longitudinal axis.

9. The blade according to claim 7 wherein at least one of said sections has twist in its plane between its inner and outer edges.

10. The blade according to claim 9 wherein a plurality of said sections have twist in their planes between their inner and outer edges.

11. The blade according to claim 10 wherein said twist in each of said sections is greater than the twist in the next inward section and smaller than the twist in the next outward section.

12. The blade according to claim 7 wherein:

a) the angle of said first section upward from said mounting area is about 26°;

b) the angle of said second section downward from the horizontal is about 3° along its leading edge and about 1° along its trailing edge;

c) the angle of said third section downward from the horizontal is about 26° along its leading edge and about 18° along its trailing edge; and d) the angle of said outer section downward from the horizontal is about 20° along its leading edge and about 9° along its trailing edge.

13. A mulching rotary lawn mower blade having a central mounting area attachable to a lawn mower motor drive shaft, said blade comprising first, second, third, and fourth cutting sections, each respectively further outward from said mounting area, said blade having a cutting edge extending along said four sections thereof which cuts grass into clippings and repetitively re-cuts said grass clippings in said fourth and said first through third sections, respectively, all of said four sections being upwardly pitched away from the direction of rotation for lifting and turbulently suspending said grass clippings during said repetitive re-cutting to provide a fine comminuted mulch.

14. A mulching rotary lawn mower blade in accordance with claim 1 wherein the trailing edge of each of said plurality of cutting sections is upwardly pitched to a greater angle than is the trailing edge of the next inward of such sections, so that said blade is a progressive propeller.

* * * * *